(No Model.)  3 Sheets—Sheet 1.

O. HAMMERSTEIN.
MACHINE FOR STRIPPING LEAF TOBACCO.

No. 316,540. Patented Apr. 28, 1885.

Witnesses:
John C. Tunbridge
John M. Speer.

Inventor:
Oscar Hammerstein
by his attorneys
Briesen & Steele (No Model.)  3 Sheets—Sheet 2.

O. HAMMERSTEIN.
MACHINE FOR STRIPPING LEAF TOBACCO.

No. 316,540. Patented Apr. 28, 1885.

(No Model.) 3 Sheets—Sheet 3.

O. HAMMERSTEIN.
MACHINE FOR STRIPPING LEAF TOBACCO.

No. 316,540. Patented Apr. 28, 1885.

Witnesses:
John C. Tunbridge
John M. Speer

Inventor:
Oscar Hammerstein
by his attorneys
Briesen & Steele

United States Patent Office.

OSCAR HAMMERSTEIN, OF NEW YORK, N. Y., ASSIGNOR TO MALVINE HAMMERSTEIN, OF SAME PLACE.

MACHINE FOR STRIPPING LEAF-TOBACCO.

SPECIFICATION forming part of Letters Patent No. 316,540, dated April 28, 1885.

Application filed October 26, 1883. (No model.)

*To all whom it may concern:*

Be it known that I, OSCAR HAMMERSTEIN, a resident of New York city, in the county and State of New York, have invented an Improved Machine for Stripping Leaf-Tobacco, of which the following is a full, clear, and exact description, reference being made to the accompanying drawings, in which—

Figure 1:
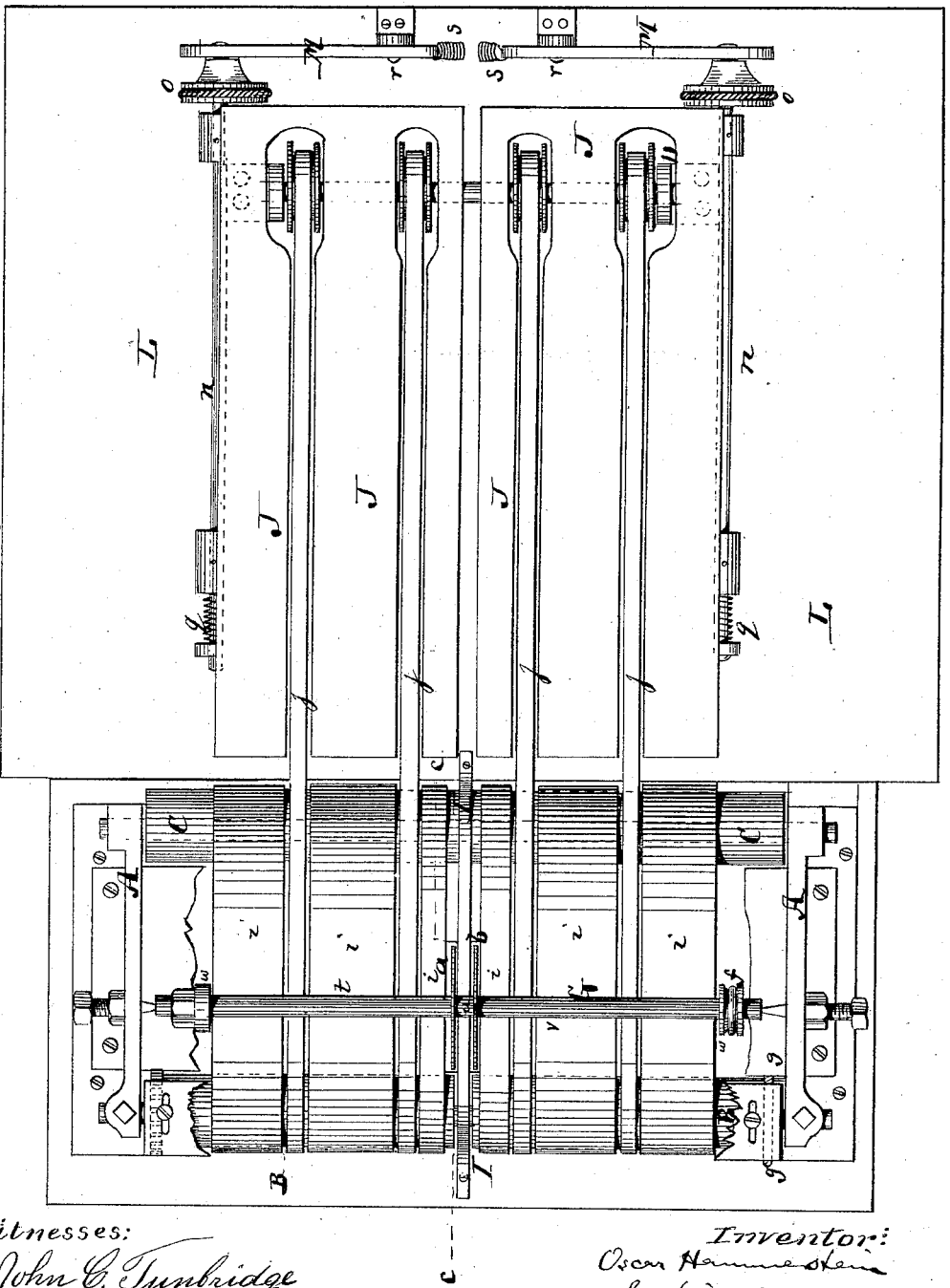
Figure 2:
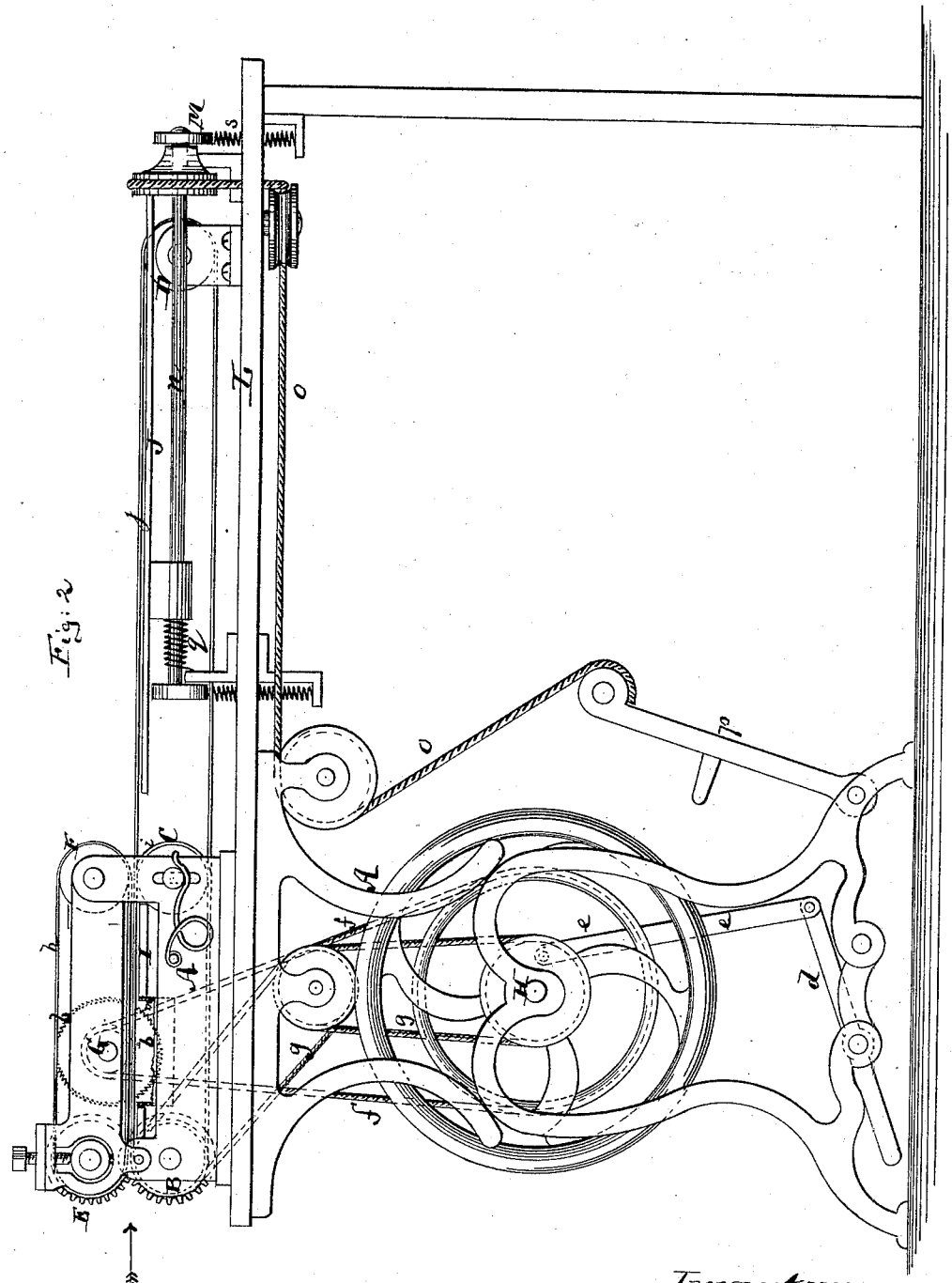
Figure 3:
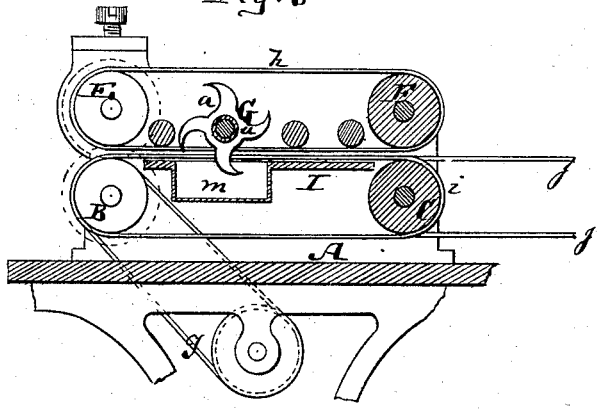
Figure 4:
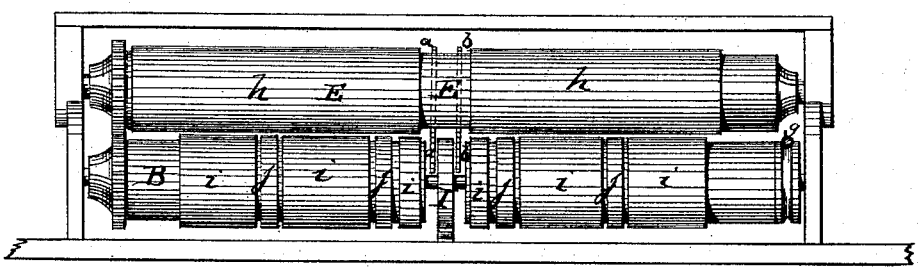
Figure 5:
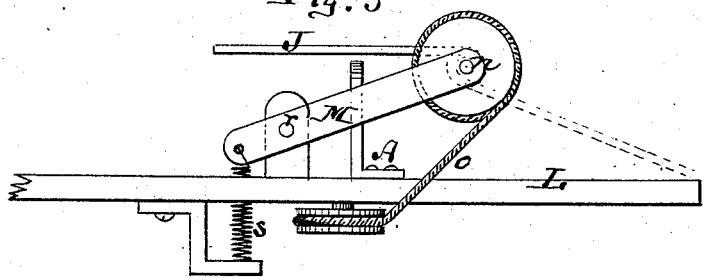
Figure 6:
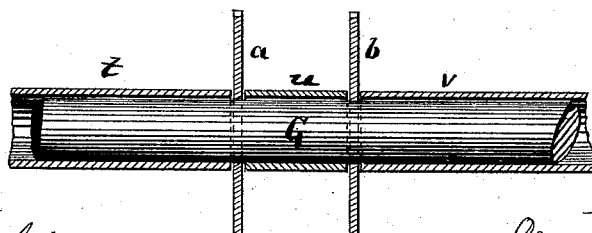

Figure 1 is a plan or top view, partly in section, of my improved machine for cutting stems out of tobacco-leaves. Fig. 2 is a side elevation of the same. Fig. 3 is a cross-section on the plane of the line $c\ c$, Fig. 1. Fig. 4 is a front end view of the machine. Fig. 5 is a detailed back view of a portion of the machine. Fig. 6 is an enlarged longitudinal section of the saw-carrying shaft which is used in the machine.

The object of this invention is to produce a machine on which the stems of tobacco-leaves can be cut out, so as to dispense with the labor of hand-stripping.

Heretofore in machines for the like purpose rotary cutters were employed, either in double pairs to work on the shear principle, or one pair of rotary cutters was used to cut on a table. In either case the apparatus was liable to get out of order very soon. From grit in the tobacco, and from other causes, the cutters soon became dull, and frequently they were bent aside, so as to destroy the entire value of the machine; hence such machines have not been introduced to a noticeable extent.

My invention principally consists in the employment of a pair of saws for cutting out the stems of the flexible leaves, in combination with endless bands for conveying the leaves and sections of leaves.

The invention consists, also, in other details of improvement that are hereinafter more fully set up.

In the drawings, the letter A represents the frame of my machine, in which are hung three parallel horizontal rollers B, C, and D, as indicated in Fig. 2. Above the rollers B C are hung, in the same framing, rollers E and F, respectively. Between the rollers E and F are the bearings of a shaft, G, which carries two circular saws, $a$ and $b$, that have their teeth alike, and that are at a distance apart from each other which corresponds with the width of the piece of leaf to be cut out by the machine.

The driving-shaft of the machine is shown at H in Fig. 2, and has rotary motion imparted to it by suitable machinery, a treadle, $d$, and connecting-rod $e$ being indicated for that purpose in the drawings. A belt, $f$, runs from a pulley on the shaft H to a pulley on the shaft G, to impart rotary motion to the saws. By another belt, $g$, or series of such belts, motion can be transmitted from the shaft H to the shaft B, which latter shaft gears in the shaft E next above it, as indicated in the drawings. Endless bands $h$ are passed over drums on the shafts E and F, and endless bands of equal length, but less in width, are passed around the lower series of rollers, B and C, as shown at $i\ i$ in the drawings. Between the series of endless bands $i\ i$ longer endless bands $j$ are passed over drums on the shafts B and D, as clearly appears from Figs. 1 and 2.

Directly beneath the space which is between the saws $a\ b$ is or may be fastened to the frame A a strip, I, of metal or other material, which will serve to support the stem part of the leaf that is being cut, but which is not wide enough to come in contact with the saw-blades.

Each of the saw-blades may be made to dip into a box, $m$, (see Fig. 3,) in which may be contained a suitable liquid or other substance for keeping the blades clean.

The machine operates in substance as follows: A leaf of tobacco is inserted between the several bands $h$, $i$, and $j$ in such manner that its stem portion will be aligned with the space between the saw-blades. The leaf is then fed forward in the direction of the arrow shown in Fig. 2, and has its stem portion cut out of it by the rapidly-revolving saw-blades, the two halves of the leaf that remain on each side being carried forward between the belts $h$ and $i$, until finally they are merely deposited on the longer belts $j$ and carried off by these. The stem part of the leaf that was cut out is discharged, when it reaches the end of the strip I, into a suitable receptable.

To the frame A are pivoted two slotted tables, J J, which are cut out in such manner (see Fig. 1) that the bands $j$ will fit into their slots. When half a leaf has been carried by each set of belts $j$ so that it is substantially above one of the tables J, the latter is swung up by turning on its pivot or supporting-shaft $n$ from the position shown by full lines in Fig. 5 into that shown by dotted lines, and the half-leaf is thereby deposited upon the stationary table L of the machine.

For turning the tables J the mechanism shown in Fig. 2 may be used, which consists of a band, $o$, passing over suitable friction-rollers to a treadle, $p$, which the operator presses when the half-leaves are in the proper position to be deposited upon the table L. As soon as the treadle $p$ is released a suitable spring or weight, $q$, which is indicated in Figs. 1 and 2, will throw the tables J back into their horizontal position. The shafts $n$, that carry the tables J, are preferably hung in levers M, that are hung to the main frame A, as indicated at $r$ in Fig. 5, and that are connected with springs $s$ or equivalent weights. The object of this arrangement is that pressure upon the treadle $p$ will, when continued, after swinging each table J, serve to draw the shaft $n$ down, and thereby cause the table to lay the half-leaf horizontally upon a pile of such half-leaves that may have already accumulated upon the table L.

Fig. 6 shows the best manner of mounting the saws $a\ b$ on the shaft G so that the distance between them may be varied according to the character of the tobacco operated upon. For this purpose I fit three tubular sleeves, $t\ u\ v$, upon the shaft G. The tube $u$ is between the saws $a\ b$, and its length determines the extent of the distance between them. The outer sleeves, $t$ and $v$, hold the saws against the inner sleeve, $u$, and bear with their outer ends against suitable shoulders, $w$, on the shaft G, such as are indicated in Fig. 1. By substituting for these tubes $t\ u\ v$ others of different lengths the distance between the saws can be readily adjusted.

I do not wish to limit myself to any particular kind of saw.

What I mean by a "saw" or "saws" in this specification is a rotating instrument having one or more projecting teeth adapted to enter into and thereupon leave contact with the leaf of tobacco to be operated upon, in contradistinction to a continuous blade which always remains in contact with the leaf, and which needs either an additional blade or a counter table to make it operative.

Fig. 3 shows one form of saw-blade $a$ which will answer the purpose.

Proper provision is made in the machine for adjusting the bearings of the several shafts employed and for holding the endless bands properly extended and in the requisite contact with each other, all of which are features that concern the mechanic, and not the inventor, and therefore need not be especially pointed out in this description.

I also desire it to be understood that shafts or rollers in proper contact with each other would in many cases be equivalents for the endless bands which I have described. Instead of rotary saws reciprocating saws may be used.

I claim—

1. The combination of the shaft G, located as described, and saws $a\ b$, both on said shaft, with a device for supporting the stem part of the leaf, the endless bands $h\ i$, and mechanism, substantially as described, for supporting and moving them, all as set forth.

2. The combination of the shaft G and saws $a\ b$ with the endless bands $h\ i\ j$, and means, substantially as described, for supporting and moving them, as set forth.

3. The combination of the shaft G and saws $a\ b$ with the box or depression $m$, and with means, substantially as described, for revolving the shaft G and for feeding leaves of tobacco to the saws, as specified.

4. The combination of the shaft G and saws $a\ b$ with the strip I and endless bands $h\ i$, substantially as described.

5. The slotted pivoted tables J, arranged in pairs, and combined with means, substantially as described, for tilting the same, and with endless bands $j$, that enter into their slots and are aligned therewith, substantially as specified.

6. The combination of the slotted table J and its shaft $n$ with the pivoted levers M, springs $s$, table L, and means, substantially as described, for turning the shaft $n$, as set forth.

OSCAR HAMMERSTEIN.

Witnesses:
WILLY G. E. SCHULTZ,
JOHN C. TUNBRIDGE.